United States Patent
Yoo et al.

(10) Patent No.: US 10,850,270 B2
(45) Date of Patent: Dec. 1, 2020

(54) PREPARATION METHOD OF CARBON-SUPPORTED METAL OXIDE AND/OR ALLOY NANOPARTICLES CATALYST USING PHYSICAL VAPOUR DEPOSITION

(71) Applicants: KOREA INSTITUTE OF SCIENCE AND TECHNOLOGY, Seoul (KR); GLOBAL FRONTIER CENTER FOR MULTISCALE ENERGY SYSTEMS, Seoul (KR)

(72) Inventors: Sung Jong Yoo, Seoul (KR); Injoon Jang, Seoul (KR); So Young Lee, Seoul (KR); Hyun Seo Park, Seoul (KR); Jin Young Kim, Seoul (KR); Jong Hyun Jang, Seoul (KR); Hyoung-Juhn Kim, Seoul (KR)

(73) Assignees: Korea Institute of Science and Technology, Seoul (KR); Global Frontier Center for Multiscale Energy Systems, Seoul (KR)

( * ) Notice: Subject to any disclaimer, the term of this patent is extended or adjusted under 35 U.S.C. 154(b) by 91 days.

(21) Appl. No.: 16/177,203

(22) Filed: Oct. 31, 2018

(65) Prior Publication Data
US 2019/0134620 A1   May 9, 2019

(30) Foreign Application Priority Data

Nov. 1, 2017   (KR) .................. 10-2017-0144707

(51) Int. Cl.
*B01J 37/34*   (2006.01)
*B01J 23/75*   (2006.01)
(Continued)

(52) U.S. Cl.
CPC ............ *B01J 37/342* (2013.01); *B01J 23/75* (2013.01); *B01J 23/892* (2013.01); *B01J 35/002* (2013.01);
(Continued)

(58) Field of Classification Search
CPC . B01J 21/18; B01J 21/185; B01J 23/42; B01J 23/44; B01J 23/70; B01J 23/72;
(Continued)

(56) References Cited

U.S. PATENT DOCUMENTS 8,354,355 B2   1/2013   Finley
9,120,121 B2   9/2015   Miller
(Continued)

FOREIGN PATENT DOCUMENTS

| KR | 10-2011-0046999 A | 5/2011 |
| KR | 10-2014-0100613 A | 8/2014 |
| KR | 10-2015-0059692 A | 12/2015 |

OTHER PUBLICATIONS

Hugges (what is DC sputtering, Semicore Equipment, Inc., C Published: Nov. 26, 2016).*
(Continued)

*Primary Examiner* — Jun Li
(74) *Attorney, Agent, or Firm* — Rabin & Berdo, P.C.

(57) ABSTRACT

Disclosed is a method for preparing a carbon-supported metal oxide and/or alloy nanoparticle catalyst. According to the method, a carbon-supported metal oxide and/or alloy nanoparticle catalyst is prepared by depositing metal oxide and/or alloy nanoparticles on a water-soluble support and dissolving the metal oxide and/or alloy nanoparticles deposited on the water-soluble support in an anhydrous polar solvent containing carbon dispersed therein to support the metal oxide and/or alloy nanoparticles on the carbon. The anhydrous polar solvent has much lower solubility for the
(Continued)

water-soluble support than water and is used to dissolve the water-soluble support. The use of the anhydrous polar solvent instead of water can prevent the water-soluble support present at a low concentration in the solution from impeding the support of the nanoparticles on the carbon, thus providing a solution to the problems of environmental pollution, high cost, and complexity encountered in conventional chemical and physical synthetic methods.

11 Claims, 7 Drawing Sheets

(51) Int. Cl.
*B01J 23/89* (2006.01)
*B01J 35/00* (2006.01)

(52) U.S. Cl.
CPC ......... *B01J 35/0013* (2013.01); *B01J 37/347* (2013.01); *B01J 37/349* (2013.01); *B01J 35/006* (2013.01)

(58) Field of Classification Search
CPC ........ B01J 23/75; B01J 23/755; B01J 37/342; B01J 37/3447; B01J 37/349
See application file for complete search history.

(56) References Cited

U.S. PATENT DOCUMENTS

| | | | |
|---|---|---|---|
| 2011/0003683 A1* | 1/2011 | Hays | B01J 23/42 502/326 |
| 2011/0104588 A1* | 5/2011 | Kwon | H01M 4/885 429/524 |
| 2014/0221192 A1* | 8/2014 | Yoo | H01M 4/9083 502/5 |
| 2015/0239918 A1* | 8/2015 | Johnson | C07F 9/572 424/9.1 |
| 2015/0375208 A1* | 12/2015 | Yang | B01J 23/6484 502/185 |
| 2016/0099472 A1* | 4/2016 | Hayden | H01M 4/8828 429/479 |
| 2017/0200954 A1* | 7/2017 | Birss | H01M 4/861 |
| 2017/0216831 A1* | 8/2017 | Nefedkin | C23C 14/08 |
| 2019/0112721 A1* | 4/2019 | Aburaya | C25B 9/04 |

OTHER PUBLICATIONS

Tsukasa Torimoto et al., "Sputter deposition onto ionic liquids: Simple and clean synthesis of highly dispersed ultrafine metal nanoparticles", Applied Physics Letters, 2006, 243117-1~243117-3, vol. 89.

Yoshikiyo Hatakeyama et al., "Synthesis of Gold Nanoparticles in Liquid Polyethylene Glycol by Sputter Deposition and Temperature Effects on their Size and Shape", The Journal of Physical Chemistry, 2011, pp. 3279-3285, vol. 115.

Hee-Young Park et al., "Green synthesis of carbon-supported nanoparticle catalysts by physical vapor deposition on soluble powder substrates", Scientific Reports, Sep. 18, 2015, pp. 1-7.

* cited by examiner

PREPARATION METHOD OF CARBON-SUPPORTED METAL OXIDE AND/OR ALLOY NANOPARTICLES CATALYST USING PHYSICAL VAPOUR DEPOSITION

BACKGROUND OF THE INVENTION

1. Field of the Invention

The present invention relates to a method for preparing a carbon-supported metal oxide and/or alloy nanoparticle catalyst by depositing metal oxide and/or alloy nanoparticles on a water-soluble support and dissolving the metal oxide and/or alloy nanoparticles deposited on the water-soluble support in an anhydrous polar solvent containing carbon dispersed therein to support the metal oxide and/or alloy nanoparticles on the carbon. More specifically, the present invention relates to a method for preparing a carbon-supported metal oxide and/or alloy nanoparticle catalyst in which an anhydrous polar solvent having much lower solubility for a water-soluble support than water is used to dissolve the water-soluble support so that nanoparticles can be effectively supported on carbon without being substantially impeded by the water-soluble support present at a low concentration in the solution, thus providing a solution to the problems of environmental pollution, high cost, and complexity encountered in conventional chemical and physical synthetic methods.

2. Description of the Related Art

Metal oxides nanoparticles and platinum-based alloy nanoparticles have been extensively investigated in various fields during the past decades because of their unique properties but need to be loaded on large surface area supports due to their thermodynamic instability when used in various industrial applications. Such carbon-supported catalysts have been usually synthesized by chemical methods. According to chemical synthetic methods, nanoparticles are prepared by adding a reducing agent to a precursor in the form of a metal salt. However, these approaches require many kinds of chemicals, particularly expensive metal precursors, reducing agents, and surfactants, and involve multiple steps, making the procedure very complex.

Alternatively, nanoparticles supported on carbon may be synthesized using physical vapor deposition. According to this approach, nanoparticles peeled off from metal clusters are stabilized in an ionic liquid or on a glucose powder such that they are prevented from growing further and remain unchanged in shape. However, the ionic liquid or the excess glucose molecules are strongly adsorbed to the nanoparticles, and as a result, the nanoparticles lose their catalytic activity or are not readily supported on carbon due to their low surface energy. The use of the expensive ionic liquid is also an obstacle to the mass production of the catalysts.

The present inventors have found that when metal oxide and/or alloy nanoparticles are deposited on a water-soluble support powder by physical vapor deposition without using an ionic liquid and the metal oxide and/or alloy nanoparticles deposited on the water-soluble support powder are dissolved in an anhydrous polar solvent containing carbon dispersed therein and having much lower solubility for the water-soluble support than water to support the metal oxide and/or alloy nanoparticles on the carbon, the nanoparticles can be effectively supported on the carbon without being substantially impeded by the water-soluble support present at a low concentration in the solution, enabling the preparation of a carbon-supported metal oxide and/or alloy nanoparticle catalyst while avoiding the problems of environmental pollution, high cost, and complexity encountered in conventional chemical and physical synthetic methods. The present invention has been accomplished based on this finding.

PRIOR ART DOCUMENTS

Patent Documents

Patent Document 1: Korean Patent Publication No. 10-2015-0059692
Patent Document 2: U.S. Pat. No. 8,354,355
Patent Document 3: U.S. Pat. No. 9,120,121

Non-Patent Documents

Non-Patent Document 1: Torimoto, Tsukasa, et al. Applied physics letters 89.24 (2006): 243117
Non-Patent Document 2: Hatakeyama, Yoshikiyo, et al. The Journal of Physical Chemistry C 115.8 (2011): 3279-3285
Non-Patent Document 3: Park, Hee-Young, et al. Scientific reports 5 (2015): 14245

SUMMARY OF THE INVENTION

The present invention has been made in view of the above problems, and it is an object of the present invention to provide a method for preparing a carbon-supported metal oxide and/or alloy nanoparticle catalyst by depositing metal oxide and/or alloy nanoparticles on a water-soluble support and dissolving the metal oxide and/or alloy nanoparticles deposited on the water-soluble support in an anhydrous polar solvent containing carbon dispersed therein to support the metal oxide and/or alloy nanoparticles on the carbon in which the anhydrous polar solvent having much lower solubility for the water-soluble support than water is used to dissolve the water-soluble support so that the nanoparticles can be effectively supported on the carbon without being substantially impeded by the water-soluble support present at a low concentration in the solution, thus providing a solution to the problems of environmental pollution, high cost, and complexity encountered in conventional chemical and physical synthetic methods.

One aspect of the present invention provides a method for preparing a carbon-supported metal oxide and/or alloy nanoparticle catalyst, including (a) depositing metal oxide and/or alloy nanoparticles on a water-soluble support, (b) adding the metal oxide and/or alloy nanoparticles deposited on the water-soluble support to an anhydrous polar solvent containing carbon dispersed therein, followed by stirring to obtain a dispersion including a carbon-supported metal oxide and/or alloy nanoparticle catalyst, (c) washing the dispersion and collecting the carbon-supported metal oxide and/or alloy nanoparticle catalyst in a solid state by filtration, and (d) drying the solid-state carbon-supported metal oxide and/or alloy nanoparticle catalyst.

According to the method of the present invention, a carbon-supported metal oxide and/or alloy nanoparticle catalyst is prepared by depositing metal oxide and/or alloy nanoparticles on a water-soluble support and dissolving the metal oxide and/or alloy nanoparticles deposited on the water-soluble support in an anhydrous polar solvent containing carbon dispersed therein to support the metal oxide and/or alloy nanoparticles on the carbon. The anhydrous polar solvent having much lower solubility for the water-soluble support than water is used to dissolve the water-soluble support so that the nanoparticles can be effectively supported on the carbon without being substantially impeded by the water-soluble support present at a low concentration in the solution, thus providing a solution to the problems of environmental pollution, high cost, and complexity encountered in conventional chemical and physical synthetic methods.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
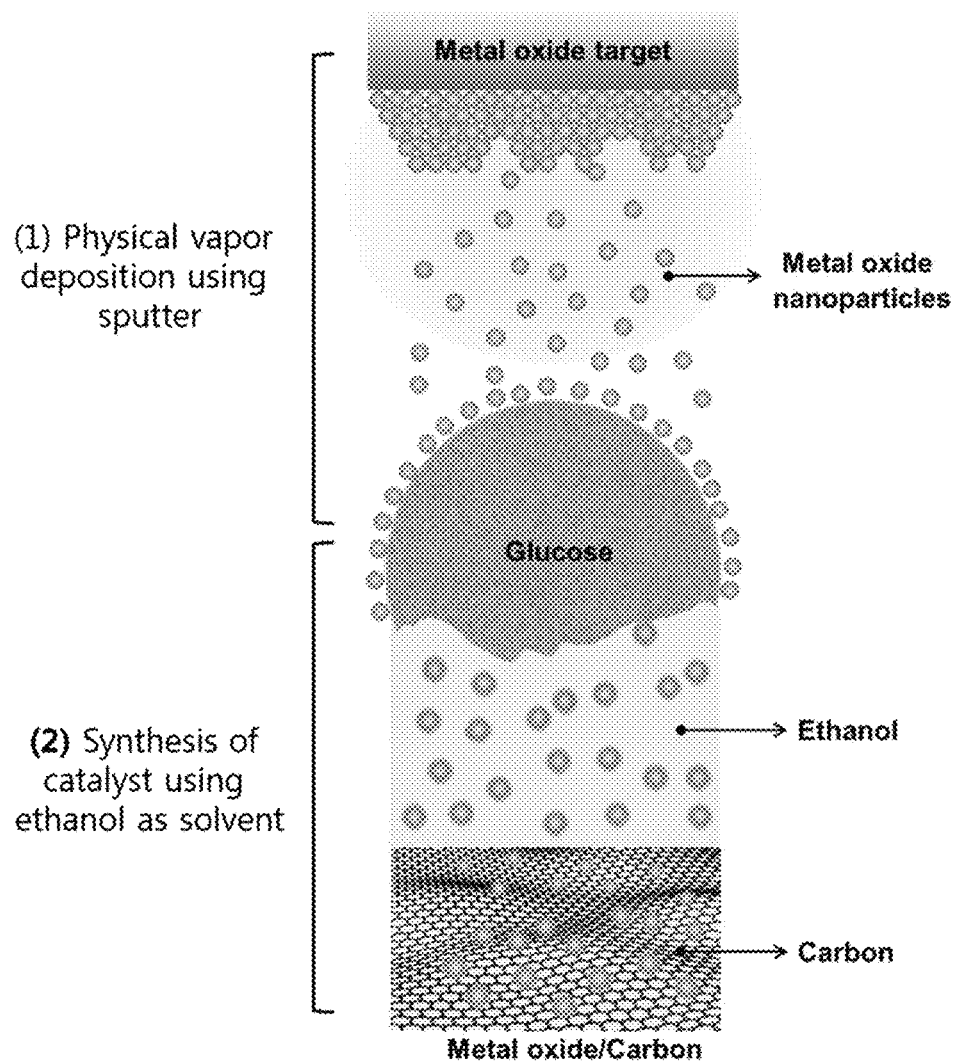
FIG. 1 is a diagram illustrating a method for synthesizing a carbon-supported metal oxide and/or alloy nanoparticle catalyst using physical vapor deposition according to the present invention.

Several aspects and various embodiments of the present invention will now be described in more detail.

One aspect of the present invention is directed to a method for preparing a carbon-supported metal oxide and/or alloy nanoparticle catalyst, including (a) depositing metal oxide and/or alloy nanoparticles on a water-soluble support, (b) adding the metal oxide and/or alloy nanoparticles deposited on the water-soluble support to an anhydrous polar solvent containing carbon dispersed therein, followed by stirring to obtain a dispersion including a carbon-supported metal oxide and/or alloy nanoparticle catalyst, (c) washing the dispersion and collecting the carbon-supported metal oxide and/or alloy nanoparticle catalyst in a solid state by filtration, and (d) drying the solid-state carbon-supported metal oxide and/or alloy nanoparticle catalyst.

A conventional method for preparing a carbon-supported metal oxide and/or alloy nanoparticle catalyst uses water as a solvent to dissolve a water-soluble support. The water-soluble support present at a high concentration in the solution impedes the support of nanoparticles, causing the catalyst to lose its activity. In contrast, the method of the present invention uses an anhydrous polar solvent instead of water to dissolve a water-soluble support. Thus, the presence of the water-soluble support at a low concentration in the solution enables effective support of nanoparticles without losing the activity of the catalyst.

According to one embodiment of the present invention, the method may further include drying the water-soluble support under vacuum before step (a).

According to a further embodiment of the present invention, the water-soluble support may be selected from: sugar powders, including glucose, sucrose, and fructose powders; water-soluble metal salt powders, including sodium chloride, potassium chloride, and sodium bicarbonate powders; water-soluble polymer powders, including PVA and PVP powders; and mixtures of two or more thereof but is not limited thereto. The use of glucose is preferred.

According to another embodiment of the present invention, the metal oxide may be selected from oxides of cobalt, platinum, gold, palladium, silver, rhodium, iridium, ruthenium, nickel, iron, copper, manganese, vanadium, chromium, yttrium, lanthanum, cerium, zirconium, titanium, tantalum, and osmium but is not limited thereto; and the alloy may be an alloy of two or more metals selected from cobalt, platinum, gold, palladium, silver, rhodium, iridium, ruthenium, nickel, iron, copper, manganese, vanadium, chromium, yttrium, lanthanum, cerium, zirconium, titanium, tantalum, and osmium but is not limited thereto. Preferably, the metal oxide is cobalt oxide and the alloy is a platinum-nickel alloy.

According to another embodiment of the present invention, the anhydrous polar solvent may be anhydrous ethanol. Particularly, a much larger amount of the metal oxide and/or alloy nanoparticles can be supported on carbon when anhydrous ethanol is used as the anhydrous polar solvent than when other solvents are used.

According to another embodiment of the present invention, the deposition may be performed by sputtering.

According to another embodiment of the present invention, the sputtering gas may be selected from helium, neon, argon, and mixtures thereof. Argon gas is preferably used. The internal pressure of the sputtering chamber is between $10^{-1}$ and $10^2$ mTorr, preferably between 1 and 50 mTorr, more preferably between 5 and 20 mTorr. The intensity of the sputtering power is between 10 and 500 W. The intensity of the sputtering power is preferably between 100 and 300 W, more preferably between 150 and 200 W for the metal oxide. The intensity of the sputtering power is preferably between 10 and 300 W, more preferably between 10 and 100 W for the alloy.

According to another embodiment of the present invention, in step (c), water may be used for the washing and filtration.

According to another embodiment of the present invention, the metal oxide and/or alloy nanoparticles may have a size of 1 to 10 nm.

Although not explicitly described in the Examples section that follows, carbon-supported metal oxide nanoparticle catalysts were prepared by optionally drying various water-soluble supports under vacuum before step (a) and by varying the kinds of the metal oxide, the anhydrous polar solvent, and the sputtering gas, the internal pressure range of the sputtering chamber, and the intensity range of the sputtering power, the kind of the washing and filtration solvent in step (c), and the size of the metal oxide particles; electrodes including the catalysts were fabricated; and the durability of the catalysts after 300 cycles of oxygen evolution reaction was investigated.

As a result, when the following conditions (i) to (x) were all met, the resulting catalysts showed initial potentials (1.70-1.71 V), which were the same within the error range of a measurement system as potentials measured at the same current density (10 mA/cm$^2$) after 300 cycles of oxygen evolution reaction, and the metal oxide nanoparticles were found to be supported to uniform thicknesses on the carbon supports over the entire areas of the catalysts within the error range of TEM images. In addition, even after 300 cycles of oxygen reduction reaction, no loss of the metal oxide nanoparticles supported on the carbon supports was observed, indicating high durability of the catalysts.

(i) The water-soluble support is dried under vacuum before step (a), (ii) the water-soluble support is glucose, (iii) the metal oxide is cobalt oxide, (iv) the anhydrous polar solvent is anhydrous ethanol, (v) the deposition is performed by sputtering, (vi) the sputtering gas is argon, (vii) the internal pressure of the sputtering chamber is from 1 to 50 mTorr, (viii) the intensity of the sputtering power is from 150 to 200 W, (ix) water is used for the washing and filtration in step (c), and (x) the cobalt oxide has a particle size of 3 to 5 nm.

If one or more of the conditions (i) to (x) were not met, the resulting catalysts showed significantly increased potentials (~1.98 V) at the same current density (10 mA/cm$^2$) after 300 cycles of oxygen reduction reaction and significantly decreased potentials (~0.8 V) at the same current density (~2.8 mA/cm$^{-2}$) after 300 cycles of oxygen evolution reaction. Further, loss of the metal oxide nanoparticles supported on the carbon supports was observed.

Although not explicitly described in the Examples section that follows, carbon-supported alloy nanoparticle catalysts were prepared by optionally drying various water-soluble supports under vacuum before step (a) and by varying the kinds of the alloy, the anhydrous polar solvent, and the sputtering gas, the internal pressure range of the sputtering chamber, and the intensity range of the sputtering power, the kind of the washing and filtration solvent in step (c), and the size of the alloy particles; electrodes including the catalysts were fabricated; and the durability of the catalysts after 300 cycles of oxygen reduction reaction were investigated.

As a result, when the following conditions (i) to (x) were all met, the resulting catalysts showed initial potentials (1.70-1.71 V), which were the same within the error range of a measurement system as potentials measured at the same current density (10 mA/cm$^2$) after 300 cycles of oxygen reduction reaction and the alloy nanoparticles were found to be supported to uniform thicknesses on carbon supports over the entire areas of the catalysts within the error range of TEM images. In addition, even after 300 cycles of oxygen reduction reaction, no loss of the alloy nanoparticles supported on the carbon supports was observed, indicating high durability of the catalysts.

(i) The water-soluble support is dried under vacuum before step (a), (ii) the water-soluble support is glucose, (iii) the alloy is a platinum-nickel alloy, (iv) the anhydrous polar solvent is anhydrous ethanol, (v) the deposition is performed by sputtering, (vi) the sputtering gas is argon, (vii) the internal pressure of the sputtering chamber is from 1 to 50 mTorr, (viii) the intensity of the sputtering power is from 10 to 100 W, (ix) water is used for the washing and filtration in step (c), and (x) the platinum-nickel alloy has a particle size of 2 to 8 nm.

If one or more of the conditions (i) to (x) were not met, the resulting catalysts showed significantly increased potentials (~1.98 V) at the same current density (10 mA/cm$^{-2}$) after 300 cycles of oxygen reduction reaction and significantly decreased potentials (~0.8 V) at the same current density (~2.8 mA/cm$^{-2}$) after 300 cycles of oxygen reduction reaction. Further, loss of the alloy nanoparticles supported on the carbon supports was observed.

According to another embodiment of the present invention, the carbon-supported metal oxide and/or alloy nanoparticle catalyst may be used as a catalyst for fuel cells (polymer electrolyte membrane fuel cells (PEMFCs), phosphoric acid fuel cells (PAFCs), and alkaline fuel cells (AEMFCs)) or a catalyst for electrochemical reactions, including water electrolysis (oxygen reduction reaction, hydrogen evolution reaction, $CO_2$ reduction, artificial photosynthesis, and electrochemical synthesis). The catalyst is preferably suitable for oxygen reduction reaction.

The present invention will be explained in detail with reference to the following examples, including preparative examples, and the accompanying drawings.

Example 1: Synthesis of Carbon-Supported Cobalt Oxide Nanoparticle Catalyst

From 24 h before deposition, glucose was dried at $10^{-2}$ torr and 90° C. to remove surface moisture. 40 g of glucose was placed in a stirrer and the stirrer was mounted in a main chamber of a sputter. A cobalt oxide (CoO) target was mounted in an RF magnetron sputtering gun and a vacuum was created using a vacuum pump. The initial vacuum was maintained at $10^{-6}$ torr. The working pressure for deposition was set to 10 mTorr using argon (Ar) gas. After the stirrer was started, cobalt oxide nanoparticles were deposited on the glucose surface by sputtering. The sputtering power was set to 180 W and the deposition was performed for 24 h.

A carbon support (Vulcan XC-72R) was placed in anhydrous ethanol and was evenly dispersed by sonication for 60 min. The cobalt oxide-deposited glucose was added to the carbon-dispersed anhydrous ethanol, followed by stirring at room temperature for about 12 h. After completion of the stirring, the solution was filtered through a filter paper, washed several times with ~2 L of distilled water to remove residual glucose, and evaporated to dryness in a vacuum oven at 60° C. for ≥2 h to completely remove water, affording a carbon-supported cobalt oxide nanoparticle catalyst.

Example 2: Synthesis of Carbon-Supported Platinum-Nickel Alloy Nanoparticle Catalyst A carbon-supported platinum-nickel alloy nanoparticle catalyst was synthesized in the same manner as in Example 1, except that co-sputtering was performed using platinum and nickel as targets instead of using cobalt oxide, the internal pressure of the sputtering chamber was changed to 1-50 mTorr, and the intensity of the sputtering power was changed to 10-100 W.

Comparative Example 1

A carbon-supported cobalt oxide nanoparticle catalyst was synthesized in the same manner as in Example 1, except that distilled water was used to disperse the carbon support instead of anhydrous ethanol.

Comparative Example 2

A carbon-supported platinum-nickel alloy nanoparticle catalyst was synthesized in the same manner as in Example 2, except that distilled water was used to disperse the carbon support instead of anhydrous ethanol.

Comparative Example 3

From 24 h before deposition, glucose was dried at $10^{-2}$ torr and 90° C. to remove surface moisture. 40 g of glucose was placed in a stirrer and the stirrer was mounted in a main chamber of a sputter. Platinum and nickel targets were mounted in an RF magnetron sputtering gun and a vacuum was created using a vacuum pump. The initial vacuum was maintained at $10^{-6}$ torr. The working pressure for deposition was set to 10 mTorr using argon (Ar) gas. After the stirrer was started, platinum and nickel nanoparticles were evenly deposited on the glucose surface by sputtering, affording platinum-nickel alloy nanoparticles deposited on the glucose. The sputtering powers were set to 20 W and 100 W for platinum and nickel, respectively, and the deposition was performed for 24 h.

Figure 2:
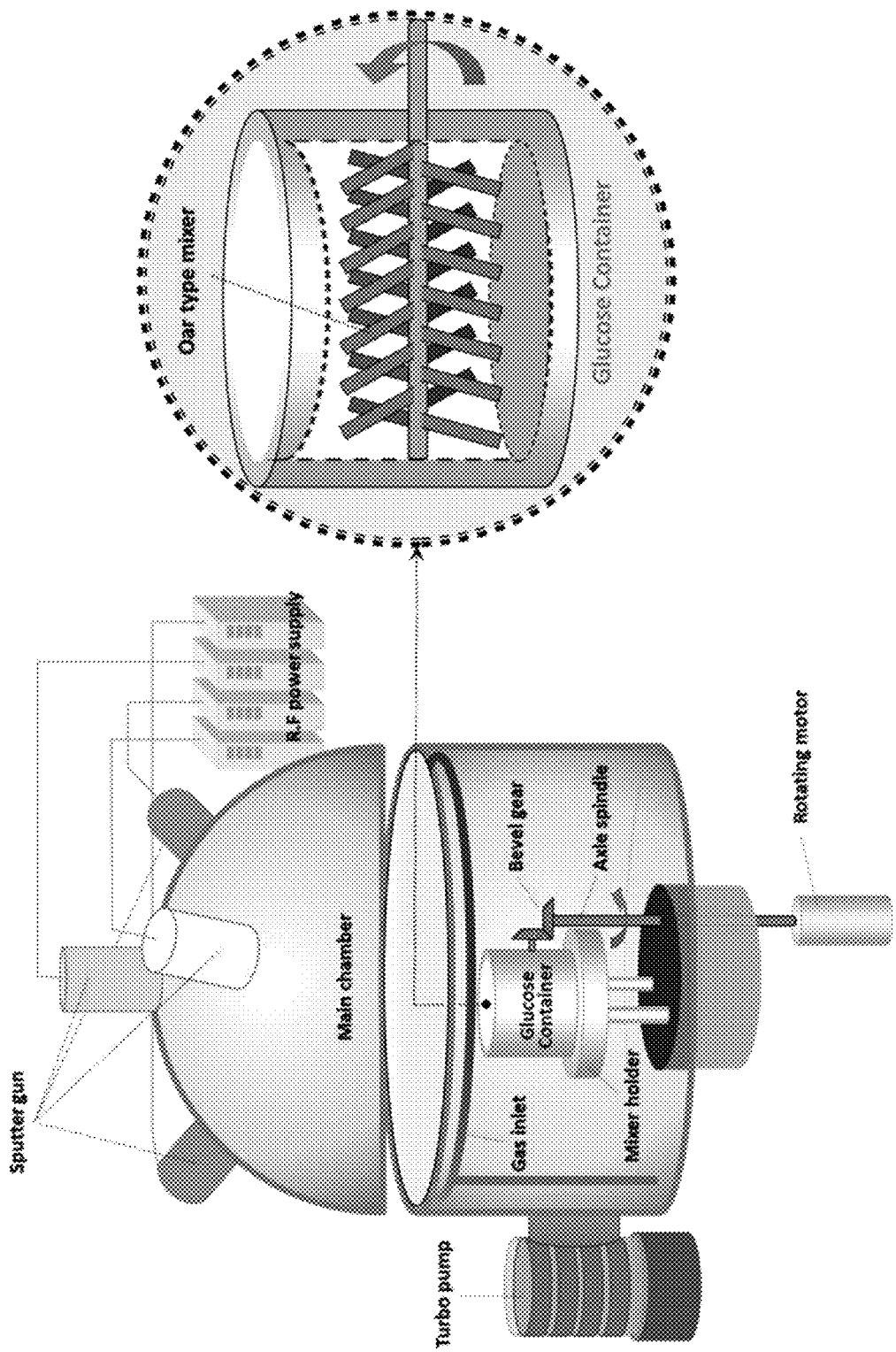
FIG. 2 is a diagram illustrating a sputtering system for depositing a metal oxide and an alloy on glucose powders in accordance with a method of the present invention.

FIG. 1 is a diagram illustrating a method for synthesizing a carbon-supported metal oxide and/or alloy nanoparticle catalyst using physical vapor deposition according to the present invention and FIG. 2 is a diagram illustrating a sputtering system for depositing a metal oxide and an alloy on glucose powders in accordance with the method of the present invention.

Referring to FIGS. 1 and 2, a method for preparing a catalyst according to one embodiment of the present invention essentially consists of two steps: (1) physical vapor deposition using a sputter and (2) synthesis of a catalyst using ethanol as a solvent (see FIG. 1). Moisture is removed from glucose as a water-soluble powder by drying in a vacuum oven for 24 h. A metal oxide and/or an alloy is deposited on the powder using a sputtering system. The sputtering system is adapted to deposit the deposition material on the powder. A stirrer capable of stirring the glucose powder is installed at a location where the substrate is placed, such that the deposition material is uniformly deposited over the entire surface of the glucose (see FIG. 2). The deposition conditions and time are freely adjustable depending on the deposition material and deposition rate. The metal oxide- and/or alloy-deposited glucose is stirred in anhydrous ethanol containing a carbon support dispersed therein for ~12 h. The resulting solution together with distilled water is filtered to remove the residual glucose powder, giving a powder of metal oxide and/or alloy nanoparticles supported on the carbon. The powder is dried in an oven at 60° C. to obtain a carbon-supported metal oxide and alloy nanoparticle catalyst, which can be used for various electrochemical reactions.

Figure 3:
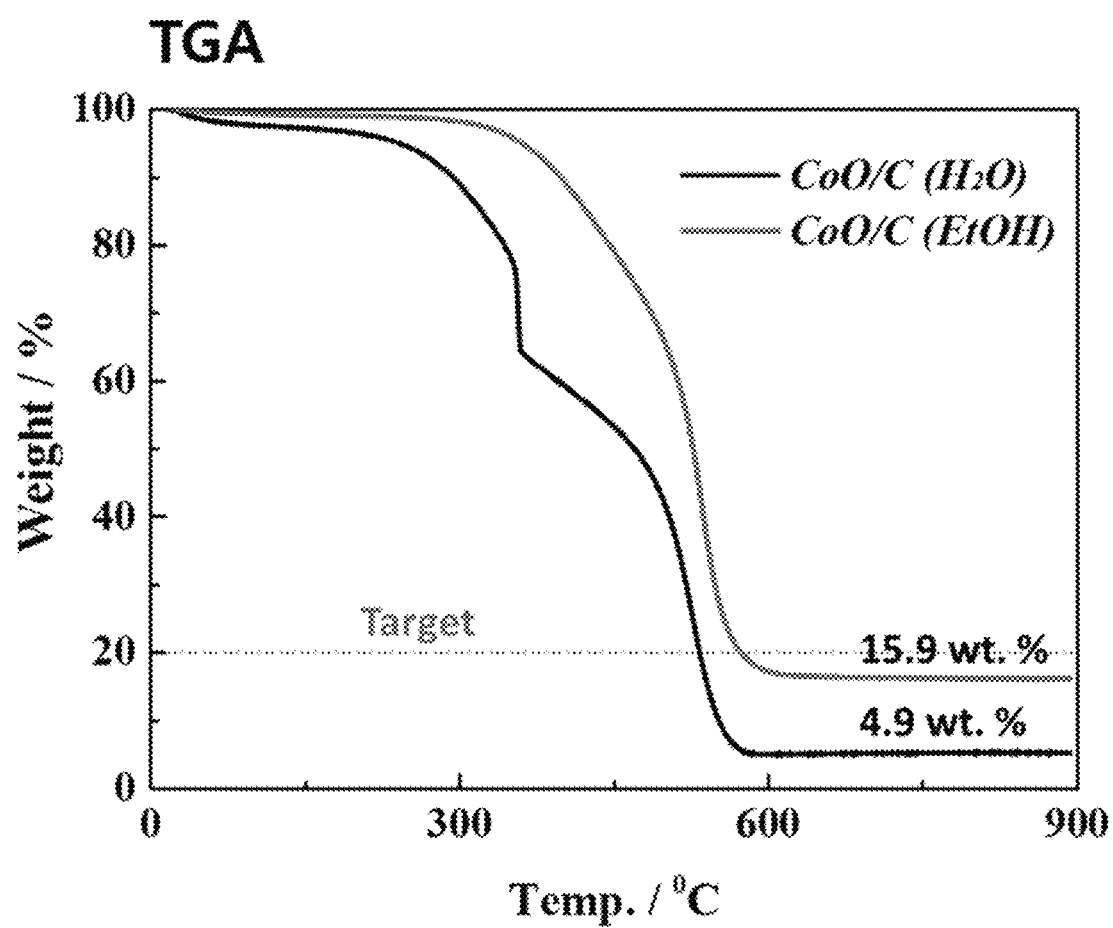
FIG. 3 shows weight percentages of cobalt oxide nanoparticles in carbon-supported catalysts prepared in Example 1 (CoO/C (EtOH)) and Comparative Example 1 (CoO/C ($H_2O$)), which were measured using a thermogravimetric analyzer (TGA)

FIG. 3 shows weight percentages (wt. %) of the cobalt oxide nanoparticles in the carbon-supported catalysts prepared in Example 1 (CoO/C (EtOH)) and Comparative Example 1 (CoO/C ($H_2O$)), which were measured using a thermogravimetric analyzer (TGA). The weight percentages of the cobalt oxide nanoparticles supported on the carbon were analyzed using a thermogravimetric analyzer (TGA) at 10° C./min in the range of 25-900° C. in an oxygen atmosphere.

Figure 5:
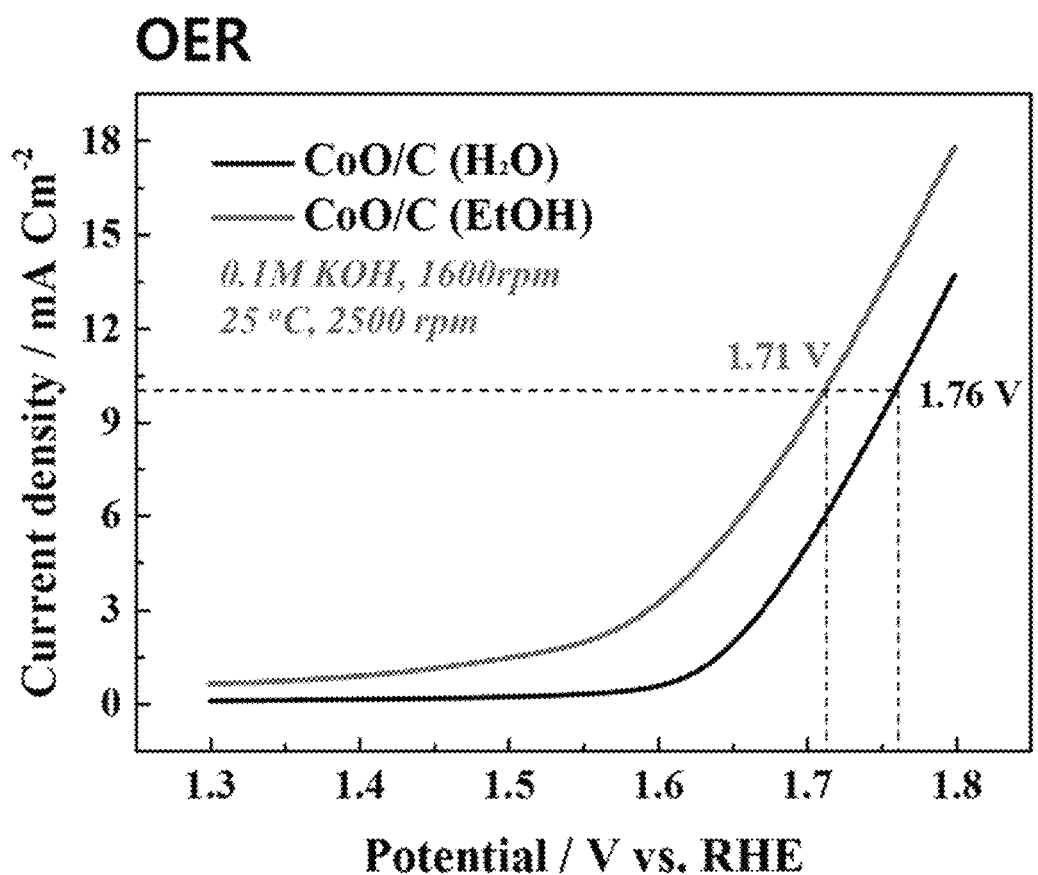
FIG. 5 shows electrochemical oxygen evolution reaction (OER) polarization curves of catalysts prepared in Example 1 (CoO/C (EtOH)) and Comparative Example 1 (CoO/C ($H_2O$))

Referring to FIG. 3, ~5 wt. % of the cobalt oxide was loaded on the carbon in the catalyst synthesized using distilled water in Comparative Example 1. In contrast, ~16 wt. % of the cobalt oxide was loaded on the carbon in the catalyst synthesized using anhydrous ethanol in Example 1. Considering the desired loading rate (20 wt. %) of the cobalt oxide, the loading rate of the cobalt oxide in the catalyst synthesized using anhydrous ethanol was much higher than that in the catalyst synthesized using distilled water, demonstrating that the use of ethyl alcohol can greatly reduce loss of the nanoparticles.

Figure 4:
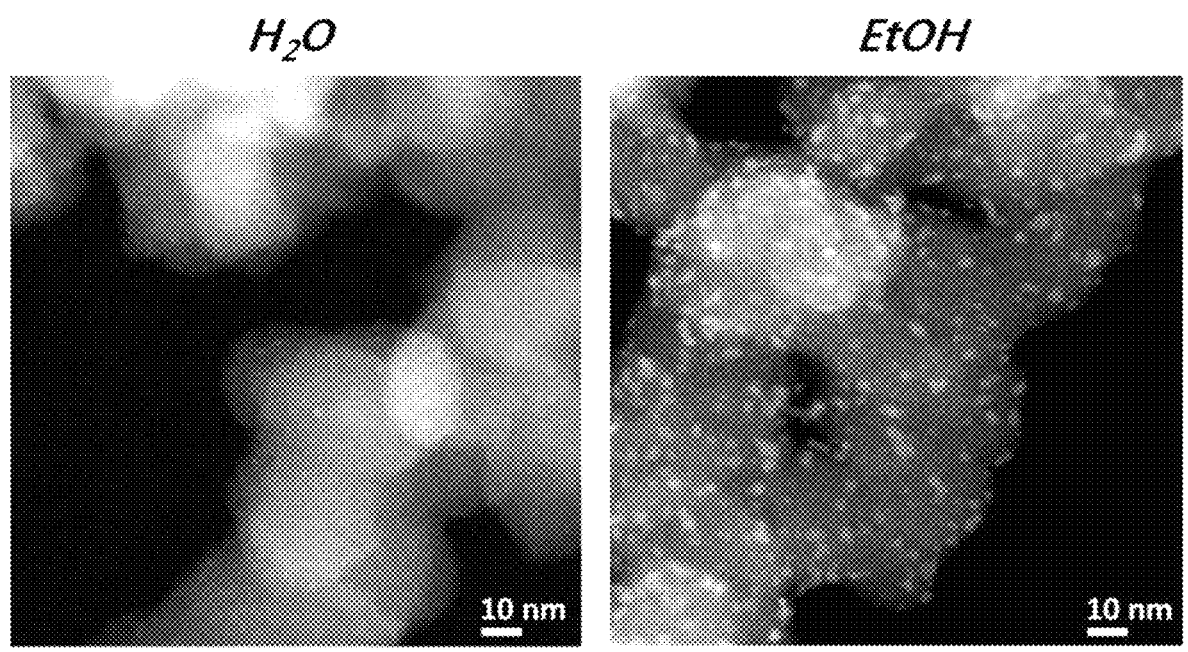
FIG. 4 shows transmission electron microscopy (TEM) images of catalysts prepared in Example 1 (CoO/C (EtOH)) and Comparative Example 1 (CoO/C ($H_2O$))

FIG. 4 shows transmission electron microscopy (TEM) images of the catalysts prepared in Example 1 (CoO/C (EtOH)) and Comparative Example 1 (CoO/C ($H_2O$)).

Referring to FIG. 4, the cobalt oxide nanoparticles were not substantially observed on the carbon support in the catalyst synthesized using distilled water in Comparative Example 1. In contrast, the cobalt oxide nanoparticles (3-5 nm) were uniformly supported on the carbon support in the catalyst synthesized using anhydrous ethanol in Example 1.

FIG. 5 shows electrochemical oxygen evolution reaction (OER) polarization curves of the catalysts prepared in Example 1 (CoO/C (EtOH)) and Comparative Example 1 (CoO/C ($H_2O$)). Polarization curves of the catalysts prepared in Example 1 and Comparative Example 1 were recorded using a rotating disk electrode (RDE) to evaluate the electrochemical oxygen evolution reaction activities of the catalysts. The area of the rotating disk electrode (RDE) was 19.6 $mm^2$. The catalysts were placed on the electrode by the following procedure. First, each of the catalysts in the form of powders was dispersed in alcohol to obtain a catalyst ink. Thereafter, the catalyst ink was dropped onto the rotating disk electrode and evaporated to dryness to remove the alcohol, leaving only the catalyst powder on the rotating disk electrode. The electrochemical properties of the catalyst were analyzed using a 3-electrode system. A saturated calomel electrode and a platinum wire were used as the reference and counter electrodes, respectively. The entire analytical procedure was carried out at room temperature.

Oxygen evolution curves were recorded under the following experimental conditions. After an electrolyte solution was saturated with oxygen, oxygen gas was continuously supplied during analysis. The scan rate was 5 mV/sec and the potential range was 1.3-1.8 V (vs. RHE). Finally, the rotating speed of the electrode was maintained at 2500 RPM.

Referring to FIG. 5, a lower potential at the same current density in the oxygen evolution reaction polarization curves indicates better oxygen evolution reaction activity. The catalyst prepared using distilled water and the catalyst prepared using anhydrous ethanol recorded potentials of 1.76 V and 1.71 V at the same current density (10 mA/$cm^2$), respectively. These results demonstrate that the catalyst synthesized using anhydrous ethanol has high electrochemical oxygen evolution reaction activity compared to the catalyst synthesized using distilled water.

Figure 6:
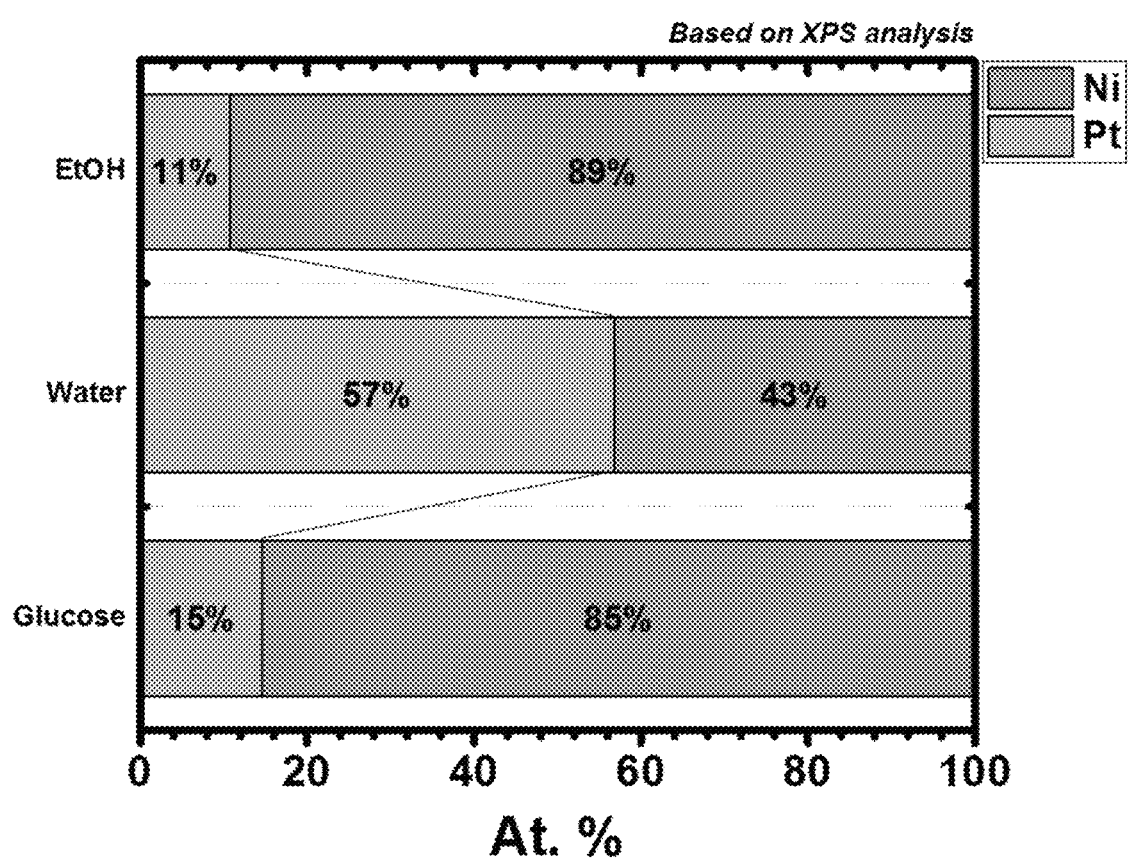
FIG. 6 shows X-ray photoelectron spectroscopy (XPS) curves of carbon-supported platinum-nickel alloy nanoparticle catalysts prepared in Example 1 (EtOH) and Comparative Example 2 (Water) and glucose-deposited platinum-nickel alloy nanoparticles prepared in Comparative Example 3 (Glucose)

FIG. 6 shows X-ray photoelectron spectroscopy (XPS) curves of the carbon-supported platinum-nickel alloy nanoparticle catalysts prepared in Example 1 (EtOH) and Comparative Example 2 (Water) and the glucose-deposited platinum-nickel alloy nanoparticles prepared in Comparative Example 3 (Glucose).

Referring to FIG. 6, the composition of the platinum-nickel (Pt—Ni) alloy in the glucose-deposited platinum-nickel alloy nanoparticles prepared in Comparative Example 3 before being dissolved in a solvent was almost the same as that in the carbon-supported platinum-nickel alloy nanoparticle catalyst prepared using anhydrous ethanol in Example 2. The platinum content of the catalyst prepared using distilled water in Comparative Example 2 is anticipated to be similar to those of the catalysts of Comparative Example 3 and Example 2 because the noble metal does not undergo surface oxidation. However, the nickel as an auxiliary catalyst is readily oxidized by distilled water due to its proneness to oxidation, resulting in a decrease in the degree of alloying of the alloy catalyst. Further, the auxiliary catalyst is dissolved and the alloy catalyst is not be loaded with a desired composition on carbon. The same results are obtained for other auxiliary catalysts, specifically Fe, Co, Cu, Mn, V, Cr, Ti, Y, La, Ce, Cu, and Zr.

Figure 7:
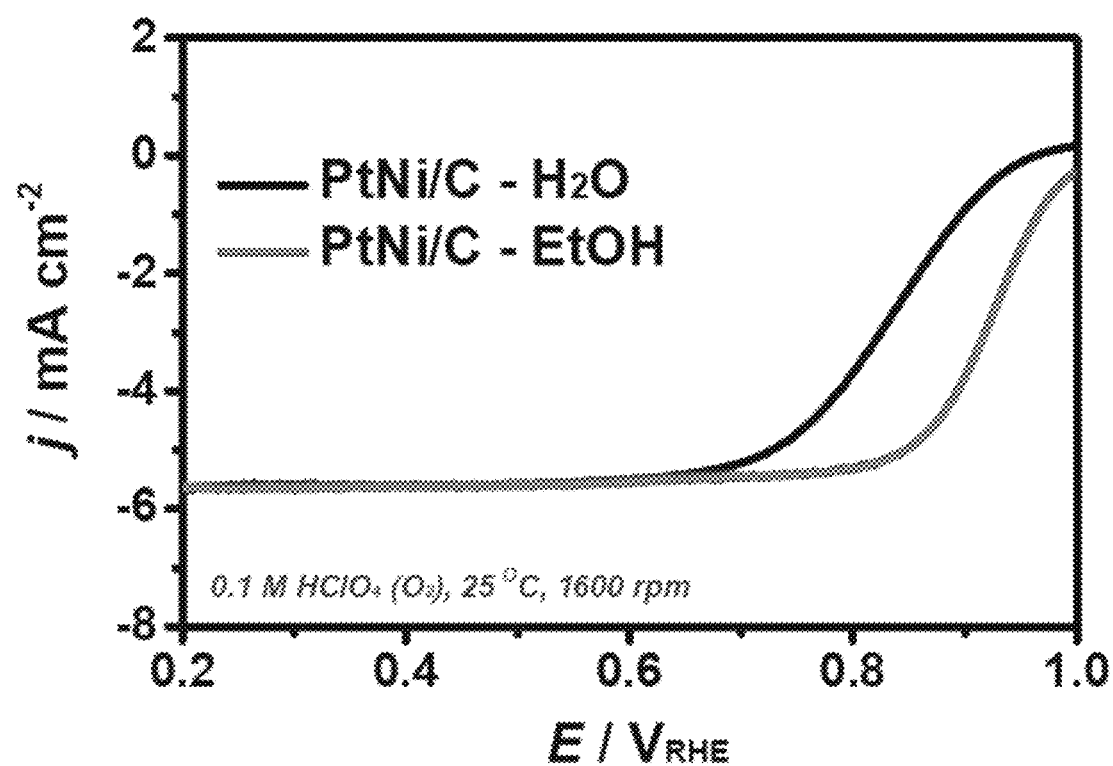
FIG. 7 shows oxygen reduction reaction (ORR) polarization curves of carbon-supported platinum-nickel alloy nanoparticle catalysts prepared in Example 1 (EtOH) and Comparative Example 2 (Water) and a glucose-deposited platinum-nickel alloy nanoparticle catalyst prepared in Comparative Example 3 (Glucose).

FIG. 7 shows oxygen reduction reaction (ORR) polarization curves of the carbon-supported platinum-nickel alloy nanoparticle catalysts prepared in Example 1 (EtOH) and Comparative Example 2 (Water) and the glucose-deposited platinum-nickel alloy nanoparticles catalyst prepared in Comparative Example 3 (Glucose). Polarization curves of the catalysts prepared in Example 2 and Comparative Example 2 were recorded using a rotating disk electrode (RDE) to evaluate the electrochemical oxygen reduction reaction activities of the catalysts. The area of the rotating disk electrode (RDE) was 19.6 mm$^2$. The catalysts were placed on the electrode by the following procedure. First, each of the catalysts in the form of powders was dispersed in alcohol to obtain a catalyst ink. Thereafter, the catalyst ink was dropped onto the rotating disk electrode and evaporated to dryness to remove the alcohol, leaving only the catalyst powder on the rotating disk electrode. The electrochemical properties of the catalyst were analyzed using a 3-electrode system. A saturated calomel electrode and a platinum wire were used as the reference and counter electrodes, respectively. The entire analytical procedure was carried out at room temperature.

Oxygen reduction curves were recorded under the following experimental conditions. After an electrolyte solution was saturated with oxygen, oxygen gas was continuously supplied during analysis. The scan rate was 5 mV/sec and the potential range was 0.2-1.0 V (vs. RHE). Finally, the rotating speed of the electrode was maintained at 1600 RPM.

Referring to FIG. 7, a higher potential at the same current density (≥0.6 V (vs. RHE)) in the oxygen reduction reaction polarization curves indicates better oxygen evolution reaction activity. Higher potentials were measured at all current densities (≥0.6 V (vs. RHE)) for the catalyst prepared using anhydrous ethanol than for the catalyst prepared using distilled water. Therefore, it can be concluded that the catalyst prepared using anhydrous ethanol has higher electrochemical oxygen reduction reaction activity than the catalyst prepared using distilled water.

What is claimed is:

1. A method for preparing a carbon-supported metal oxide and alloy nanoparticle catalyst, comprising:
   (a) physical vapor depositing metal oxide and alloy nanoparticles on a water-soluble support without using an ionic liquid,
   (b) adding the metal oxide and alloy nanoparticles deposited on the water-soluble support to an anhydrous polar solvent containing carbon dispersed therein in order to decrease a concentration of the water-soluble support, followed by stirring to obtain a dispersion comprising a carbon-supported metal oxide and alloy nanoparticle catalyst,
   (c) washing the dispersion and collecting the carbon-supported metal oxide and alloy nanoparticle catalyst in a solid state by filtration, and
   (d) drying the solid-state carbon-supported metal oxide and alloy nanoparticle catalyst.

2. The method according to claim 1, further comprising drying the water-soluble support under vacuum before step (a).

3. The method according to claim 1, wherein the water-soluble support is selected from: sugar powders, comprising glucose, sucrose, and fructose powders; water-soluble metal salt powders, comprising sodium chloride, potassium chloride, and sodium bicarbonate powders; water-soluble polymer powders, comprising PVA and PVP powders; and mixtures of two or more thereof.

4. The method according to claim 1, wherein the metal oxide is selected from oxides of cobalt, platinum, gold, palladium, silver, rhodium, iridium, ruthenium, nickel, iron, copper, manganese, vanadium, chromium, yttrium, lanthanum, cerium, zirconium, titanium, tantalum, and osmium; and the alloy is an alloy of two or more metals selected from cobalt, platinum, gold, palladium, silver, rhodium, iridium, ruthenium, nickel, iron, copper, manganese, vanadium, chromium, yttrium, lanthanum, cerium, zirconium, titanium, tantalum, and osmium.

5. The method according to claim 1, wherein the anhydrous polar solvent is anhydrous ethanol.

6. The method according to claim 1, wherein the deposition is performed by sputtering.

7. The method according to claim 6, wherein the sputtering gas is argon, the internal pressure of the sputtering chamber is between $10^{-1}$ and $10^2$ mTorr, and the intensity of the sputtering power is between 10 and 500 W.

8. The method according to claim 1, wherein, in step (c), water is used for the washing and filtration.

9. The method according to claim 1, wherein the metal oxide and alloy nanoparticles have a size of 1 to 10 nm.

10. The method according to claim 1, wherein the method further comprises drying the water-soluble support under vacuum before step (a), the water-soluble support is glucose, the metal oxide is cobalt oxide, the anhydrous polar solvent is anhydrous ethanol, the deposition is performed by sputtering, the sputtering gas is argon, the internal pressure of the sputtering chamber is from 1 to 50 mTorr, the intensity of the sputtering power is from 150 to 200 W, water is used for the washing and filtration in step (c), and the cobalt oxide has a particle size of 3 to 5 nm.

11. The method according to claim 1, wherein the method further comprises drying the water-soluble support under vacuum before step (a), the water-soluble support is glucose, the alloy is a platinum-nickel alloy, the anhydrous polar solvent is anhydrous ethanol, the deposition is performed by sputtering, water is used for the washing and filtration in step (c), the sputtering gas is argon, the internal pressure of the sputtering chamber is from 1 to 50 mTorr, the intensity of the sputtering power is from 10 to 100 W, and the platinum-nickel alloy has a particle size of 2 to 8 nm.

* * * * *